US012562145B2

(12) United States Patent
Thompson et al.

(10) Patent No.: US 12,562,145 B2
(45) Date of Patent: Feb. 24, 2026

(54) METHOD FOR NOISE CANCELLATION IN A ROOM AND SOUND SYSTEM

(71) Applicant: GN Hearing A/S, Ballerup (DK)

(72) Inventors: Stephen C. Thompson, State College, PA (US); Andrew Dittberner, Antioch, IL (US)

(73) Assignee: GN HEARING A/S, Ballerup (DK)

( * ) Notice: Subject to any disclaimer, the term of this patent is extended or adjusted under 35 U.S.C. 154(b) by 776 days.

(21) Appl. No.: 18/261,667

(22) PCT Filed: Sep. 13, 2019

(86) PCT No.: PCT/EP2019/074506
§ 371 (c)(1),
(2) Date: Jul. 14, 2023

(87) PCT Pub. No.: WO2020/053396
PCT Pub. Date: Mar. 19, 2020

(65) Prior Publication Data
US 2024/0221716 A1 Jul. 4, 2024

Related U.S. Application Data

(60) Provisional application No. 62/745,282, filed on Oct. 12, 2018, provisional application No. 62/731,727, filed on Sep. 14, 2018.

(51) Int. Cl.
*G10K 11/178* (2006.01)
*H04R 1/40* (2006.01)
*H04R 3/00* (2006.01)

(52) U.S. Cl.
CPC .. *G10K 11/17873* (2018.01); *G10K 11/17823* (2018.01); *H04R 1/403* (2013.01);
(Continued)

(58) Field of Classification Search
CPC ....... G10K 11/17873; G10K 11/17823; G10K 2210/12; G10K 2210/3046;
(Continued)

(56) References Cited

U.S. PATENT DOCUMENTS

2007/0086606 A1* 4/2007 Goodwin ................ H04R 1/40 381/116
2010/0310090 A1* 12/2010 Davis ..................... H04R 27/00 381/82
2016/0093282 A1 3/2016 Moshksar

FOREIGN PATENT DOCUMENTS

CN 102449688 5/2012
CN 103797821 5/2014
(Continued)

OTHER PUBLICATIONS

Kwon, Interior noise control with an active window system, 2013.*
(Continued)

*Primary Examiner* — William A Jerez Lora
(74) *Attorney, Agent, or Firm* — Vista IP Law Group, LLP

(57) ABSTRACT

A sound system and a method for noise cancellation in a room is provided, the method comprising arranging a set of microphones at a distance from an opening in a wall of the room for provision of one or more microphone input signals including a first microphone input signal; arranging a set of speakers in a vicinity of the opening; determining, based on at least the first microphone input signal, one or more output signals for the set of speakers for matching of sound entering the room through the opening; generating the one or more output signals; and outputting sound signals based on the one or more output signals with the set of speakers.

21 Claims, 3 Drawing Sheets

(52) U.S. Cl.
CPC ............. *H04R 1/406* (2013.01); *H04R 3/005* (2013.01); *G10K 2210/12* (2013.01); *G10K 2210/3046* (2013.01); *G10K 2210/3215* (2013.01); *H04R 2201/401* (2013.01)

(58) Field of Classification Search
CPC ............ G10K 2210/3215; H04R 1/403; H04R 1/406; H04R 3/005; H04R 2201/401
USPC ...................................... 381/71.1, 71.4, 71.8
See application file for complete search history.

(56) References Cited

FOREIGN PATENT DOCUMENTS

| | | | | | |
|---|---|---|---|---|---|
| CN | 112930565 | | | 6/2021 | |
| DE | 10 2016 007 391 | A1 | | 12/2017 | |
| KR | 1999 015238 | | | 8/1997 | |
| KR | 19990015238 | | | 5/1999 | |
| WO | WO-2008012308 | A2 | * | 1/2008 | ............... H04R 3/00 |
| WO | WO-2008015215 | A2 | * | 2/2008 | ........... G10K 11/178 |
| WO | WO-2008034789 | A1 | * | 3/2008 | ....... G10K 11/17857 |

OTHER PUBLICATIONS

Lam, Active control of noise through open windows, 2019.*
Kwon, Interior noise control with an active window system (Year: 2013).*
Lam, Active control of noise through open windows (Year: 2019).*
English Translation of Office Action for Chinese patent application No. 201980071394.0 issued on Jun. 27, 2023.
PCT International Search Report for International Patent Appln. No. PCT/EP2019/074506, Applicant GN Hearing A/S, dated Nov. 14, 2019.
PCT Written Opinion for International Patent Appln. No. PCT/EP2019/074506, Applicant GN Hearing A/S, dated Nov. 14, 2019.
Lam, B., et al., “Active control of sound through full-sized open windows,” Building and Environment, 141, 16-27.doi:10.1016/j.buildenv.2018.05.042, dated 2018.
Kwon, B., “Interior noise control with an active window system,” Applied Acoustics, dated Jan. 3, 2013.
Foreign OA for CN Patent Appln. No. 201980071394.0 dated Jun. 28, 2023.

* cited by examiner

METHOD FOR NOISE CANCELLATION IN A ROOM AND SOUND SYSTEM

RELATED APPLICATION DATA

This application is the national stage of International Patent Application No. PCT/EP2019/074506 filed on Sep. 13, 2019, which claims priority to and the benefit of U.S. Provisional Patent Application No. 62/731,727 filed on Sep. 14, 2018, lapsed, and U.S. Provisional Patent Application No. 62/745,282 filed on Oct. 12, 2018, lapsed. The entire disclosures of all of the above applications are expressly incorporated by reference herein.

FIELD

The present disclosure relates to a method for noise cancellation in a room and sound system for noise cancellation.

BACKGROUND

In many office workspaces in moderate climates it may be desirable to open windows for ventilation, e.g. in the summer months. The open windows can often provide entry for loud and annoying sounds from the outside.

SUMMARY

Accordingly, there is a need for method and systems for reducing the noise level in workspaces or rooms while maintaining substantially free passageway for ventilation to the outside.

A method for noise cancellation in a room is disclosed, the method comprising arranging a set of microphones at a distance from an opening in a wall of the room for provision of one or more microphone input signals including a first microphone input signal; arranging a set of speakers in a vicinity of the opening; determining, based on at least the first microphone input signal, one or more output signals for the set of speakers for matching, such as cancellation and/or reduction, of sound entering the room through the opening; generating the one or more output signals; and outputting sound signals based on the one or more output signals with the set of speakers.

Further, a sound system for noise cancellation in a room is disclosed, the sound system comprising a set of microphones for provision of one or more microphone input signals including a first microphone input signal; a set of speakers for outputting sound signals based on output signals; and a processing device connected to the set of microphones and to the set of speakers, the processing device comprising a signal processor. The signal processor is configured to determine the one or more output signals for the set of speakers for matching, such as cancellation and/or reduction, of sound entering the room through an opening in a wall of the room, wherein the one or more output signals are based on at least the first microphone input signal; generate the one or more output signals; and output the output signals to the set of speakers.

The present disclosure allows for a way to allow fresh air to enter the room, but to reduce the noise in the room or keep the outside noise from entering the room.

It is an important advantage of the present disclosure that noise from the outside is heavily reduced or prevented from entering the room while the original functions of the opening is substantially retained.

The present disclosure provides global cancellation (or global reduction) of the noise entering a room through an opening, such as an open window. According to the present disclosure, the sound/noise is cancelled as it enters the room. Once the sound/noise enters the room, it will begin to reflect from all of the surfaces within the room, and global cancellation is no longer possible.

A method for noise cancellation in a room, includes: arranging a set of microphones at a distance from an opening in a wall of the room for provision of one or more microphone input signals including a first microphone input signal; arranging a set of speakers in a vicinity of the opening; determining, based on at least the first microphone input signal, one or more output signals for the set of speakers for matching of sound entering the room through the opening; and outputting sound signals based on the one or more output signals with the set of speakers.

Optionally, the set of speakers is arranged along an outer edge of and in a cross shape through the middle of the opening in the wall. Optionally, the set of speakers is evenly distributed.

Optionally, the set of speakers has a flat frequency response.

Optionally, the method further includes generating one or more drive signals for the set of speakers, wherein the one or more drive signals are the one or more output signals, or are based on the one or more output signals.

Optionally, the method further includes amplifying the drive signals.

Optionally, the set of microphones comprises at least ten microphones.

Optionally, the set of speakers comprises at least ten speakers.

Optionally, the set of microphones includes a first set of microphones arranged at a distance larger than 0.5 m from the opening.

Optionally, the set of microphones includes a second set of microphones arranged at an edge of the opening.

Optionally, the act of arranging a set of speakers in the vicinity of the opening comprises distributing a first plurality of speakers across the opening.

Optionally, the act of arranging the set of speakers in the vicinity of the opening comprises arranging a second plurality of speakers along a circumference of the opening.

Optionally, the act of arranging the set of speakers in the vicinity of the opening comprises arranging at least some of the speakers in a sparse array across the opening. Optionally, the method further includes arranging a first reference microphone in the room for provision of a first reference signal, wherein the act of determining the one or more output signals for the set of speakers for matching of sound entering the room through the opening is performed based on the first reference signal.

A sound system for noise cancellation in a room, includes: a set of microphones for provision of one or more microphone input signals including a first microphone input signal; a set of speakers configured to output sound signals based on one or more output signals; and a processing device connected to the set of microphones and to the set of speakers, the processing device comprising a signal processor; wherein the signal processor is configured to determine the one or more output signals for the set of speakers for matching of sound entering the room through an opening in a wall of the room, wherein the one or more output signals are based on at least the first microphone input signal; and wherein the set of speakers is configured to output the sound signals based on the one or more output signals.

Optionally, the set of speakers is arranged along an outer edge of and in a cross shape through the middle of the opening in the wall. Optionally, the set of speakers is evenly distributed.

Optionally, the set of speakers has a flat frequency response.

Optionally, the set of speakers comprises a sparse array of speakers, the sparse array of speakers comprising N rows and M columns, and wherein the number N of rows in the sparse array is at least three and/or the number M of columns in the sparse array is at least three.

Optionally, the sparse array of speakers comprises at least a first center column of speakers to be arranged in the opening, wherein the number of speakers in the first center column is at least five.

Optionally, the sparse array of speakers comprises at least a first center row of speakers to be arranged in the opening, wherein the number of speakers in the first center row is at least five.

Optionally, the sparse array of speakers forms at least 3 cells.

A method for noise cancellation in a room, includes: arranging a set of microphones at a distance from an opening in a wall of the room for provision of one or more microphone input signals including a first microphone input signal; arranging a set of speakers in a vicinity of the opening; determining, based on at least the first microphone input signal, one or more output signals for the set of speakers for matching of sound entering the room through the opening; generating the one or more output signals; and outputting sound signals based on the one or more output signals with the set of speakers.

Optionally, the set of speakers is arranged along an outer edge of and in a cross shape through the middle of the opening in the wall. Optionally, the set of speakers is evenly distributed.

Optionally, the set of speakers has a flat frequency response.

Optionally, determining one or more output signals for the set of speakers comprises determining a drive signal for each speaker of the set of speakers.

Optionally, generating the output signals comprises generating the drive signals and amplifying the drive signals.

Optionally, the set of microphones comprises at least ten microphones.

Optionally, the set of speakers comprises at least ten speakers.

Optionally, the set of microphones includes a first set of microphones arranged at a distance larger than 0.5 m from the opening.

Optionally, the set of microphones includes a second set of microphones arranged at an edge of the opening.

Optionally, arranging a set of speakers in a vicinity of the opening comprises distributing a first set of speakers across the opening.

Optionally, arranging a set of speakers in a vicinity of the opening comprises arranging a second set of speakers along a circumference of the opening.

Optionally, arranging a set of speakers in a vicinity of the opening comprises arranging a set of speakers in a sparse array across the opening.

Optionally, the method further includes arranging a first reference microphone in the room for provision of a first reference signal, and wherein determining one or more output signals for the set of speakers for matching of sound entering the room through the opening is based on the first reference signal.

A sound system for noise cancellation in a room, includes: a set of microphones for provision of one or more microphone input signals including a first microphone input signal; a set of speakers for outputting sound signals based on output signals; and a processing device connected to the set of microphones and to the set of speakers, the processing device comprising a signal processor, wherein the signal processor is configured to: determine the output signals for the set of speakers for matching of sound entering the room through an opening in a wall of the room, wherein the output signals are based on at least the first microphone input signal; generate the output signals; and output the output signals to the set of speakers.

Optionally, the set of speakers is arranged along an outer edge of and in a cross shape through the middle of the opening in the wall. Optionally, the set of speakers is evenly distributed.

Optionally, the set of speakers has a flat frequency response.

Optionally, the set of speakers comprises a sparse array of speakers, the sparse array of speakers comprising N rows and M columns, and wherein the number N of rows in the sparse array is at least three and the number M of columns in the sparse array is at least three.

Optionally, the sparse array of speakers comprises at least a first center column of speakers to be arranged in the opening, wherein the number of speakers in the first center column is at least five.

Optionally, the sparse array of speakers comprises at least a first center row of speakers to be arranged in the opening, wherein the number of speakers in the first center row is at least five.

Optionally, the sparse array of speakers forms at least 3 cells.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
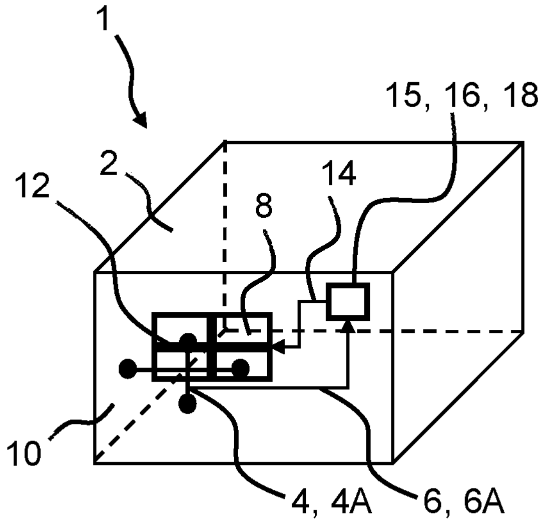
FIG. 1 schematically illustrates an exemplary sound system according to the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure features a method for noise cancellation in a room, the method comprising arranging a set of microphones at a distance from an opening in a wall of the room for provision of one or more microphone input signals including a first microphone input signal. The opening may be a window aperture. The opening may be a ventilation channel. The set of microphones are optionally arranged outside the room. The set of microphones may comprise a plurality of microphones, such as a microphone array, for provision of a plurality of microphone input signals including a first microphone input signal and a second microphone input signal. The set of microphones may comprise four or more microphones, such as at least ten microphones for provision of corresponding microphone input signals.

The set of microphones comprises a first microphone for provision of a first microphone input signal. The first microphone is arranged in a first position at a first distance from the opening. The set of microphones optionally comprises a second microphone for provision of a second microphone input signal. The second microphone is arranged in a second position at a second distance from the opening. The second distance may be the same as or different from the first distance. The distance of a microphone from the opening is measured along an axis perpendicular to the wall of the room.

The set of microphones may include a first set of microphones, e.g. including the first microphone and/or the second microphone. The first set of microphones may be arranged at a distance larger than 0.5 m from the opening, such as at a distance in the range from 1.0 m to 4.0 m from the opening. The first set of microphones provides a first set of microphone input signals, and determining one or more output signals for the set of speakers for matching, such as cancellation and/or reduction, of sound entering the room through the opening may be based on the first set of microphone input signals. The first set of microphones may be arranged outside the room.

The set of microphones may include a second set of microphones, e.g. including the second microphone. The second set of microphones may be arranged at a distance less than 0.5 m from the opening. The second set of microphones may be arranged at an edge of the opening. The second set of microphones provides a second set of microphone input signals, and determining one or more output signals for the set of speakers for matching, such as cancellation and/or reduction, of sound entering the room through the opening may be based on the second set of microphone input signals. The first set of microphones may be arranged at a different distance from the opening than the distance of the second set of microphones from the opening. The difference between the two distances may be at least 0.25 m, such as at least 1 m. The second set of microphones allows for an accurate determination of the delay time and/or the proper amplitude to achieve cancellation of sound entering the room. Thus, an improved cancellation of the outside noise within the room is achieved. The second set of microphones may be arranged within, inside and/or outside the room.

The method comprises arranging a set of speakers also denoted transducers in a vicinity of the opening, such as at one or more edges and/or across the opening. The set of speakers may comprise at least ten speakers, such as at least 40 speakers, e.g. in the range from 50 to 100 speakers. The set of speakers may be arranged at a distance less than 1 m from the opening, e.g. on the inside and/or on the outside of the opening, such as at a distance less than 0.5 m from the opening, such as at a distance less than 0.1 m from the opening.

In the method, arranging a set of speakers in a vicinity of the opening optionally comprises distributing a first set of speakers across the opening. The first set of speakers may comprise at least ten speakers, such as at least 20 speakers.

In the method, arranging a set of speakers in a vicinity of the opening optionally comprises arranging a second set of speakers along a circumference of the opening. The second set of speakers may comprise at least ten speakers, such as at least 20 speakers.

In the method, arranging a set of speakers in a vicinity of the opening optionally comprises arranging a set of speakers in a sparse array at edges of and/or across the opening. The set of speaker, e.g. the sparse array of speakers, may be arranged at a distance less than 1 m from the opening, e.g. on the inside and/or on the outside of the opening, such as at a distance less than 0.5 m from the opening, such as at a distance less than 0.1 m from the opening.

The method comprises determining, based on at least the first microphone input signal, one or more output signals for the set of speakers for matching, such as cancellation and/or reduction, of sound entering the room through the opening. In the method, determining one or more output signals for the set of speakers may comprise determining a drive signal for each speaker of the set of speakers. In the method, determining one or more output signals for the set of speakers may comprise determining first output signal(s) for the first set of speakers. In the method, determining one or more output signals for the set of speakers may comprise determining second output signal(s) for the second set of speakers. Determining one or more output signals may comprise determining signal processing parameters for processing the one or more microphone input signals.

Exemplary signal processing parameters comprise filter coefficients and/or gain coefficients. The signal processing parameters may be stored in a memory of signal processing device.

The method comprises generating the one or more output signals such as first output signal(s) and/or second output signal(s); and outputting sound signals based on the one or more output signals, such as first output signal(s) and/or second output signal(s), with the set of speakers, e.g., with the first set of speakers and/or the second set of speakers. Generating the one or more output signals may comprise generating the drive signals and amplifying the drive signals. Generating the one or more output signals may comprise processing the one or more microphone input signals according to the signal processing parameters.

The method may comprise arranging a first reference microphone in the room for provision of a first reference signal. In the method, determining one or more output signals for the set of speakers for matching, such as cancellation and/or reduction, of sound entering the room through the opening is optionally based on the first reference signal. Thus, it is possible to evaluate and/or control the feed-forward noise cancellation based on the microphones arranged at a distance from the opening. The reference microphone in the room can detect how much of the sound that would ideally have been cancelled is actually getting into the room. The magnitude of this "error signal" can be used to adjust the overall level of the cancellation signal to achieve best reduction of the sound from outside.

In one or more exemplary methods, generating the one or more output signals may comprise applying equalization filters to the one or more microphone signals, e.g., applying separate equalization filters or compensation filters for each speaker or for separate groups of speakers of the set of speakers.

In one or more exemplary methods, generating the one or more output signals may comprise applying a finite impulse response (FIR) band-pass filter.

The method may comprise obtaining one or more opening parameters including a first opening parameter and/or a second opening parameter and optionally selecting a speaker configuration of the set of speakers based on one or more opening parameters, such as the first opening parameter and/or the second opening parameter. The first opening parameter may be indicative of an opening size, such as height and/or width of the opening. The first opening parameter may be indicative of an opening radius and/or opening diameter. The second opening parameter may be indicative of opening shape, such as rectangular, circular, oval, etc.

Selecting a speaker configuration of the set of speakers may comprise determining one or more array parameters of a sparse array of speakers based on one or more opening parameters and selecting the speaker configuration based on the one or more array parameters. A first array parameter may be number of rows in the sparse array. A second array parameter may be number of columns in the sparse array. One or more exemplary array parameters, such as a third array parameter, may be indicative of number of speakers in the sparse array of speaker, e.g. the number of speakers in row(s) of the sparse array and/or the number of speakers in column(s) of the sparse array. One or more exemplary array parameters, such as a fourth array parameter and/or a fifth array parameter, may be indicative of distance between neighboring columns and/or rows.

In the method, determining one or more output signals for the set of speakers for matching, such as cancellation and/or reduction, of sound entering the room through the opening may be based on the speaker configuration of the set of speakers.

Further, a sound system is disclosed. The sound system may be configured to perform the method as disclosed herein or at least steps thereof.

The sound system comprises a set of microphones for provision of one or more microphone input signals including a first microphone input signal. Further details of the set of microphones are described above and with reference to the figures.

The sound system comprises a set of speakers for outputting sound signals based on output signals. Further details of the set of speakers are described above and with reference to the figures.

The sound system comprises a processing device connected to the set of microphones and to the set of microphones, wherein the processing device comprises a signal processor. The signal processor is configured to determine the output signals for the set of speakers for matching, such as cancellation and/or reduction, of sound entering the room through an opening in a wall of the room, wherein the output signals are based on at least the first microphone input signal; generate the output signals; and output the output signals to the set of speakers.

In the method and/or in the sound system, the set of speakers may comprise a sparse array of speakers, the sparse array of speakers comprising N rows and M columns. The number N of rows in the sparse array may be at least two or at least three, such as three, four, five or more. The number M of columns in the sparse array may be at least two or at least three, such as three, four, five or more.

Speakers (some of) of the set of speakers, e.g., when arranged in a sparse array, may be arranged in a first center row, e.g., along a straight first center row axis. The number NCR_1 of speakers in the first center row may be larger than the number M of columns in the sparse array, e.g., NCR_1>M. In one or more exemplary methods/sound systems, the number NCR_1 of speakers in the first center row may be larger than three, such as larger than five, e.g., six, ten, twelve, sixteen, eighteen, twenty, or more. Thus, the sparse array may comprise a first center row of speakers. In one or more exemplary methods/sound systems, the sparse array of speakers optionally comprises at least a first center row of speakers to be arranged in and/or across the opening, wherein the number of speakers in the first center row may be at least five.

Speakers (some of) of the set of speakers, e.g., when arranged in a sparse array, may be arranged in a second center row, e.g., along a straight second row axis. The number NCR_2 of speakers in the second center row may be larger than the number M of columns in the sparse array, e.g., NCR_2>M. In one or more exemplary methods/sound systems, the number NCR_2 of speakers in the second center row may be larger than three, such as larger than five, e.g., six, ten, twelve, sixteen, eighteen, twenty, or more.

Thus, the sparse array may comprise a second center row of speakers. In one or more exemplary methods/sound systems, the sparse array of speakers optionally comprises at least a second center row of speakers to be arranged in and/or across the opening, wherein the number of speakers in the second center row may be at least five.

Speakers (some of) of the set of speakers, e.g., when arranged in a sparse array, may be arranged in a first edge row, e.g., along a straight first edge row axis. The number NER_1 of speakers in the first edge row may be larger than the number M of columns in the sparse array, e.g., NER_1>M. In one or more exemplary methods/sound systems, the number NER_1 of speakers in the first edge row may be larger than three, such as larger than five, e.g., six, ten, twelve, sixteen, eighteen, twenty, or more. Thus, the sparse array may comprise a first edge row of speakers. The first edge row of speakers may be arranged along a first edge of the opening.

Speakers (some of) of the set of speakers, e.g., when arranged in a sparse array, may be arranged in a second edge row, e.g., along a straight second edge row axis. The number NER_2 of speakers in the second edge row may be larger than the number M of columns in the sparse array, e.g., NER_2>M. In one or more exemplary methods and/or sound systems, the number NER_2 of speakers in the second edge row may be larger than three, such as larger than five, e.g., six, ten, twelve, sixteen, eighteen, twenty, or more. Thus, the sparse array may comprise a second edge row of speakers. The second edge row of speakers may be arranged along a second edge of the opening.

The number M of columns in the sparse array may be at least two or at least three, such as three, four, five or more.

Speakers (some of) of the set of speakers, e.g., when arranged in a sparse array, may be arranged in a first center column, e.g., along a straight first center column axis. The number MCC_1 of speakers in the first center column may be larger than the number N of columns in the sparse array, e.g., MCC_1>N. In one or more exemplary methods/sound systems, the number MCC_1 of speakers in the first center column may be larger than three, such as larger than five, e.g., six, ten, twelve, sixteen, eighteen, twenty, or more. Thus, the sparse array may comprise a first center column of speakers. In one or more exemplary methods and/or sound systems, the sparse array of speakers optionally comprises at least a first center column of speakers to be arranged in and/or across the opening, wherein the number of speakers in the first center column may be at least five.

Speakers (some of) of the set of speakers, e.g., when arranged in a sparse array, may be arranged in a second center column, e.g., along a straight second center column axis. The number MCC_2 of speakers in the second center column may be larger than the number N of columns in the sparse array, e.g., MCC_2>N. In one or more exemplary methods/sound systems, the number MCC_2 of speakers in the second center column may be larger than three, such as larger than five, e.g., six, ten, twelve, sixteen, eighteen, twenty, or more. Thus, the sparse array may comprise a second center column of speakers. In one or more exemplary methods and/or sound systems, the sparse array of speakers optionally comprises at least a second center column of speakers to be arranged in and/or across the opening, wherein the number of speakers in the second center column may be at least five.

Speakers (some of) of the set of speakers, e.g., when arranged in a sparse array, may be arranged in a first edge column, e.g., along a straight first edge column axis. The number MEC_1 of speakers in the first edge column may be larger than the number N of rows in the sparse array, e.g., MEC_1>N. In one or more exemplary methods/sound systems, the number MEC_1 of speakers in the first edge column may be larger than three, such as larger than five, e.g., six, ten, twelve, sixteen, eighteen, twenty, or more. Thus, the sparse array may comprise a first edge column of speakers. The first edge column of speakers may be arranged along a third edge of the opening.

Speakers (some of) of the set of speakers, e.g., when arranged in a sparse array, may be arranged in a second edge column, e.g., along a straight second edge column axis. The number MEC_2 of speakers in the second edge column may be larger than the number N of rows in the sparse array, e.g., MEC_2>N. In one or more exemplary methods and/or sound systems, the number MEC_2 of speakers in the second edge column may be larger than three, such as larger than five, e.g., six, ten, twelve, sixteen, eighteen, twenty, or more. Thus, the sparse array may comprise a second edge column of speakers. The second edge column of speakers may be arranged along a fourth edge of the opening.

The sparse array of cells forms a number of cells. The sparse array of speakers may form at least 3 cells, such as four, eight, nine, ten, twelve, sixteen, twenty, twenty-five or more cells. In one or more exemplary methods/sound systems, the cells of the sparse array may be quadratic and/or rectangular. For example, one or a plurality of, such as all cells of the sparse array have a height/width ratio in the range from 0.8 to 1.2. In one or more exemplary methods/sound systems, one or a plurality of, such as all, cells of the sparse array cells may have a width in the range from 10 cm to 50, cm such as in the range from 20 cm to 40 cm. In one or more exemplary methods/sound systems, one or a plurality of, such as all, cells of the sparse array cells may have a height in the range from 10 cm to 50 cm, such as in the range from 20 cm to 40 cm.

The sparse array may have a width in the range from 20 cm to 2 m, such as about 0.5 m, about 1, or about 1.5 m. In one or more exemplary methods/sound systems, the sparse array has a width in the range from 0.4 m to 1 m.

The sparse array may have a height in the range from 20 cm to 2 m, such as about 0.5 m, about 1, or about 1.5 m. In one or more exemplary methods/sound systems, the sparse array has a height in the range from 0.4 m to 1 m.

Speakers (some of) of the set of speakers, such as a second set of speakers, may be arranged along an edge of the opening, e.g., along a curved, such as circular or oval, edge of the opening. The number NES of speakers along the curved edge of the opening may be larger than ten. Thus, the sparse array may comprise a at least ten edge speakers, e.g., arranged along a curved edge of the opening.

In the present disclosure, "room" is to be understood as any enclosed space within the structure of a building. The space may be as small as the bedroom of a modest home, or as large as an airplane hangar. It is assumed that the space is not completely anechoic, but make no further assumptions on the reverberation time or other characteristics of the reverberation.

In the present disclosure, "global cancellation or global reduction" is to be understood as that the sound entering through the opening (such as an open window or ventilation channel) is reduced at a majority of locations within the room, and optionally that the amount of reduction is not significantly changed by moving people or objects within the room.

According to the present disclosure, a set of speakers are arranged or configured to be arranged around and/or within/across the opening/window aperture e.g. on the inside or on the outside of the opening. The number and/or size of the speakers within the opening is reduced to allow a substantially unobstructed view and/or ventilation through the opening. The sound system is a feedforward cancellation system, where the incoming sound is sensed by a set of microphones "upstream" from the cancellation source (speaker) position. The output signals required for cancellation is "fed forward" to the cancellation sources (speakers) to be transmitted at the proper time and level to achieve adequate cancellation.

The method and/or sound system is in particular useful for noise cancellation in the frequency range from 200 Hz to 1,500 Hz, such as in the range from 300 Hz to 1,200 Hz.

FIG. 1 shows an exemplary sound system 1 for noise cancellation in a room 2. The sound system 1 comprises a set of microphones 4, such as a microphone array 4A, for provision of one or more microphone input signals 6 including a first microphone input signal 6A.

The set of microphones 4 is arranged outside the room 2 at a distance, such as about 1 m or 2 m, from an opening 8 in a wall 10 of the room 2. The sound system 1 comprises a set of speakers 12 for outputting sound signals based on output signals 14; and a processing device 15 connected to the set of microphones 4 and to the set of speakers 12. The set of speakers 12 is arranged to output sound signals into the room, wherein the sound signals cancel or at least reduce sound entering through the opening 8, e.g., from one or more noise sources outside the room. The processing device 15 comprises a signal processor 16 configured to determine the output signals 14 for the set of speakers 12 for matching, such as cancellation and/or reduction, of sound entering the room through an opening in a wall of the room. The output signals 14 are based on at least the first microphone input signal 6A and optionally one or more other microphone input signals, such as a second microphone input signal, a third microphone input signal and a fourth microphone input signal. The signal processor 16 is further configured to generate the output signals 14; and output the output signals 14 to the set of speakers 12. The signal processor 16 may be accommodated in a housing 18 of the processing device. The processing device 15 may be mounted inside or outside the room 2.

Figure 2:
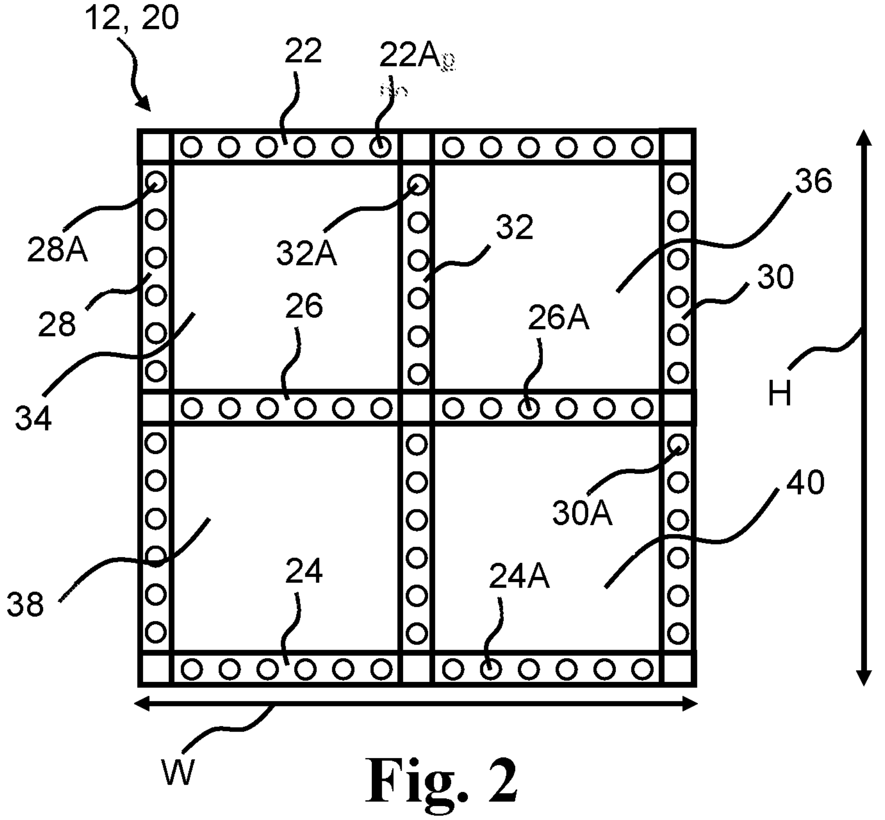
FIG. 2 shows an exemplary set of speakers.

FIG. 2 shows an exemplary set of speakers 12. The set of speakers 12 comprises a sparse array 20 of speakers, the sparse array of speakers comprising three rows including a first edge row 22 with speakers 22A, a second edge row 24 with speakers 24A, and a first center row 26 with speakers 26A. The sparse array comprises three columns including a first edge column 28 with speakers 28A, a second edge column 30 with speakers 30A, and a first center column 32 with speakers 32A, and the three rows 22, 24, 26 and three columns 28, 30, 32 form four cells 34, 36, 38, 40. Each cell 34, 36, 38, 40 has a width in the range from 0.10 m to 1.00 m, such as in the range from 0.15 m to 0.30 m. Each cell 34, 36, 38, 40 has a height in the range from 0.10 m to 1.00 m, such as in the range from 0.15 m to 0.30 m.

The first edge row 22, the second edge row 24, and the first center row 26, each comprise twelve speakers, i.e., NER_1=NER_2=NCR_1=12. The first edge column 28, the second edge column 30, and the first center column 32, each comprise twelve speakers, i.e., MER_1=MEC_2=MCC_1=12. The first center row 26 and the first center column 32 are configured for arrangement across the opening. The first edge row 22, the second edge row 24, the first edge column 28, and the second edge column 30 are each configured for arrangement along respective first, second, third, and fourth edges of the opening.

In the illustrated sparse array 20, the sparse array 20 has a width W of about 0.5 m and a height H of about 0.5 m.

Figure 3:
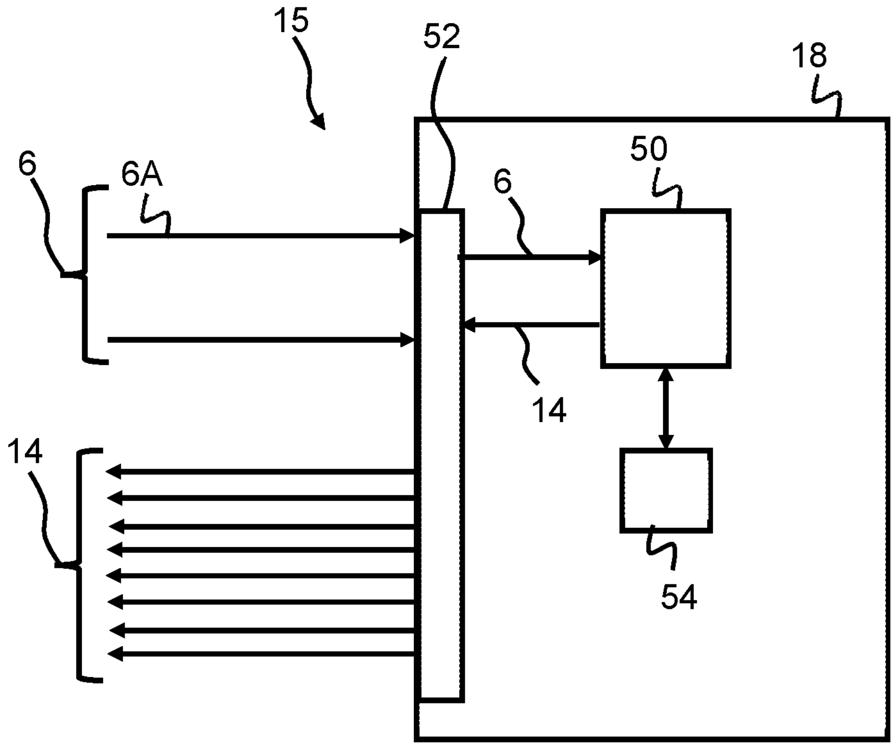
FIG. 3 shows an exemplary processing device.

FIG. 3 shows an exemplary processing device 15 of a sound system. The processing device comprises a signal processor 50 and an interface 52 connected to the signal processor 50. The interface 52 is configured for connecting with the set of microphones for receiving microphone inputs signal(s). The interface 52 is configured for connecting with the set of speakers for outputting output signals to the set of speakers. The signal processor 50 is configured to determine the output signals 14 for the set of speakers for matching of sound entering the room through an opening in a wall of the room, wherein the output signals 14 are based on at least the first microphone input signal 6A received via the interface 52; generate the output signals 14; and output the output signals 14 to the set of speakers via the interface 52. The processing device 15 comprises a memory 54, e.g., for storing signal processing parameters, such as filter coefficients and/or gain coefficients, to be used by the signal processor 50.

Figure 4:
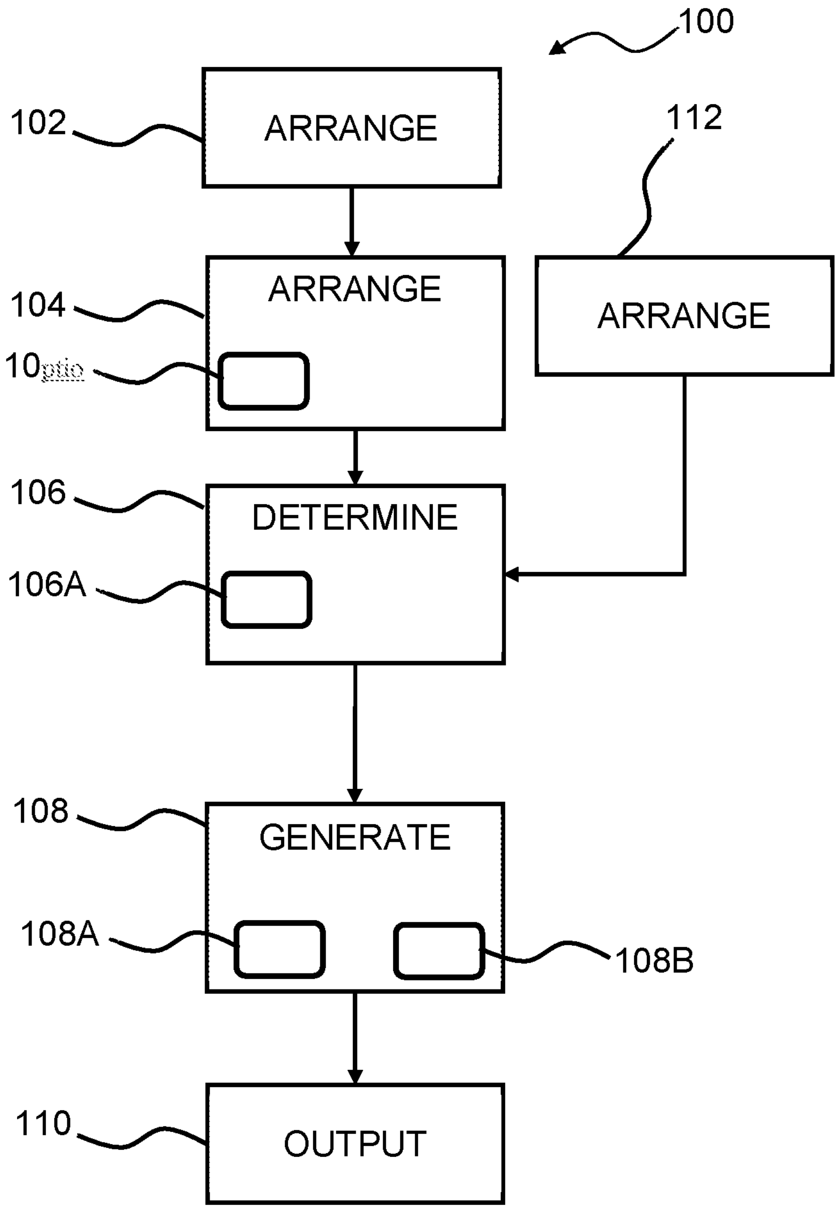
FIG. 4 is a flow diagram of an exemplary method according to the disclosure.

FIG. 4 illustrates a flow diagram of an exemplary method according to the present disclosure. The method 100 is a method for noise cancellation in a room, the method 100 comprising arranging 102 a set of microphones at a distance from an opening in a wall of the room for provision of one or more microphone input signals including a first microphone input signal; arranging 104 a set of speakers in a vicinity of the opening; determining 106, based on at least the first microphone input signal, one or more output signals for the set of speakers for matching of sound entering the room through the opening: generating 108 the one or more output signals; and outputting 110 sound signals based on the one or more output signals with the set of speakers.

In one or more exemplary methods 100, determining 106 one or more output signals for the set of speakers optionally comprises determining 106A a drive signal for each speaker of the set of speakers, and generating 108 the output signals comprise generating 108A the drive signals and amplifying the drive signals.

In the method 100, arranging 104 a set of speakers in a vicinity of the opening optionally comprises arranging 104A a set of speakers in a sparse array across and/or around the opening.

The method 100 optionally comprises arranging 112 a first reference microphone in the room for provision of a first reference signal, and wherein determining 106 one or more output signals for the set of speakers for matching of sound entering the room through the opening may be based on the first reference signal.

Also disclosed are methods and/or sound systems according to any of the following items.

Item 1. A method for noise cancellation in a room, the method comprising: arranging a set of microphones at a distance from an opening in a wall of the room for provision of one or more microphone input signals including a first microphone input signal;
arranging a set of speakers in a vicinity of the opening;
determining, based on at least the first microphone input signal, one or more output signals for the set of speakers for matching of sound entering the room through the opening;
generating the one or more output signals; and
outputting sound signals based on the one or more output signals with the set of speakers.

Item 2. Method according to item 1, wherein determining one or more output signals for the set of speakers comprises determining a drive signal for each speaker of the set of speakers.

Item 3. Method according to item 2, wherein generating the output signals comprises generating the drive signals and amplifying the drive signals.

Item 4. Method according to any of items 1-3, wherein the set of microphones comprises at least ten microphones.

Item 5. Method according to any of items 1-4, wherein the set of speakers comprises at least ten speakers.

Item 6. Method according to any of items 1-5, wherein the set of microphones includes a first set of microphones arranged at a distance larger than 0.5 m from the opening.

Item 7. Method according to any of items 1-6, wherein the set of microphones includes a second set of microphones arranged at an edge of the opening.

Item 8. Method according to any of items 1-7, wherein arranging a set of speakers in a vicinity of the opening comprises distributing a first set of speakers across the opening.

Item 9. Method according to any of items 1-8, wherein arranging a set of speakers in a vicinity of the opening comprises arranging a second set of speakers along a circumference of the opening.

Item 10. Method according to any of items 1-9, wherein arranging a set of speakers in a vicinity of the opening comprises arranging a set of speakers in a sparse array across the opening.

Item 11. Method according to any of items 1-10, the method comprising arranging a first reference microphone in the room for provision of a first reference signal, and wherein determining one or more output signals for the set of speakers for matching of sound entering the room through the opening is based on the first reference signal.

Item 12. A sound system for noise cancellation in a room, the sound system comprising: a set of microphones for provision of one or more microphone input signals including a first microphone input signal;
a set of speakers for outputting sound signals based on output signals; and a processing device connected to the set of microphones and to the set of speakers, the processing device comprising a signal processor,
wherein the signal processor is configured to:
determine the output signals for the set of speakers for matching of sound entering the room through an opening in a wall of the room, wherein the output signals are based on at least the first microphone input signal;

generate the output signals; and output the output signals to the set of speakers.

Item 13. Sound system according to item 12, wherein the set of speakers comprises a sparse array of speakers, the sparse array of speakers comprising N rows and M columns, and wherein the number N of rows in the sparse array is at least three and the number M of columns in the sparse array is at least three.

Item 14. Sound system according to item 13, wherein the sparse array of speakers comprises at least a first center column of speakers to be arranged in the opening, wherein the number of speakers in the first center column is at least five.

Item 15. Sound system according to any of items 13-14, wherein the sparse array of speakers comprises at least a first center row of speakers to be arranged in the opening, wherein the number of speakers in the first center row is at least five.

Item 16. Sound system according to any of items 13-15, wherein the sparse array of speakers forms at least 3 cells.

LIST OF REFERENCES

1 sound system
2 room
4 set of microphones
4A microphone array
6 set of microphone input signals
6A first microphone input signal
8 opening
10 wall
12 set of speakers
14 output signals
15 processing device
16 signal processor
18 housing
20 sparse array of speakers
22 first edge row of speakers
22A speaker
24 second edge row of speakers
24A speaker
26 first center row of speakers
26A speaker
28 first edge column of speakers
28A speaker
30 second edge column of speakers
30A speaker
32 first center column of speakers
32A speaker
34 first cell
36 second cell
38 third cell
40 fourth cell
50 signal processor
52 interface
54 memory
100 method for noise cancellation in a room 102 arranging a set of microphones at a distance from an opening in a wall of the room
104 arranging a set of speakers in a vicinity of the opening
104A arranging a set of speakers in a sparse array across and/or around the opening
106 determining one or more output signals for the set of speakers
106A determining a drive signal for each speaker of the set of speakers
108 generating the one or more output signals
108A generating the drive signals and amplifying the drive signals
110 outputting sound signals based on the one or more output signals
112 arranging a first reference microphone in the room
H height of sparse array
M number of rows of sparse array
N number of columns of sparse array
W width of sparse array

The invention claimed is:

1. A method for noise cancellation in a room, the method comprising:

arranging a set of microphones at a distance from an opening in a wall of the room for provision of one or more microphone input signals including a first microphone input signal;

arranging a set of speakers with respect to the opening, wherein at least some of the speakers are arranged across the opening to form an uneven coverage of an area of the opening;

determining, based on at least the first microphone input signal, one or more output signals for the set of speakers for matching of sound entering the room through the opening; and outputting sound signals by the set of speakers based on the one or more output signals.

2. The method according to claim 1, further comprising generating one or more drive signals for the set of speakers, wherein the one or more drive signals are based on the one or more output signals.

3. The method according to claim 2, further comprising amplifying the drive signals.

4. The method according to claim 1, wherein the one or more output signals are one or more drive signals.

5. The method according to claim 1, wherein the set of microphones comprises at least ten microphones.

6. The method according to claim 1, wherein the set of speakers comprises at least ten speakers.

7. The method according to claim 1, wherein the set of microphones includes a first set of microphones arranged at a distance larger than 0.5 m from the opening.

8. The method according to claim 7, wherein the set of microphones includes a second set of microphones arranged at an edge of the opening.

9. The method according to claim 1, wherein at least some of the microphones in the set of microphones surrounds the opening.

10. The method according to claim 1, wherein the at least some of the speakers is a first subset of speakers in the set of speakers, wherein the act of arranging the set of speakers with respect to the opening also comprises arranging a second subset of speakers in the set of speakers along a circumference of the opening.

11. The method according to claim 1, wherein the act of arranging the set of speakers with respect to the opening comprises arranging the at least some of the speakers in a sparse array across the opening.

12. The method according to claim 1, further comprising arranging a first reference microphone in the room for provision of a first reference signal, wherein the act of determining the one or more output signals for the set of speakers for matching of sound entering the room through the opening is performed based on the first reference signal.

13. The method according to claim 1, wherein the at least some of the speakers are arranged across the opening to define at least two cells in the opening, each of the cells having an area that is larger than a cross-sectional area of each of the speakers.

14. The method according to claim 1, wherein the at least some of the speakers are arranged across the opening to at least partly define a cell in the opening, wherein the cell has a first dimension along a first direction, and a second dimension along a second direction perpendicular to the first direction, wherein the first dimension of the cell is larger than a first spacing between a first pair of speakers in the at least some of the speakers arranged along the first direction, and wherein the second dimension of the cell is larger than a second spacing between a second pair of speakers in the at least some of the speakers arranged along the second direction.

15. A sound system for noise cancellation in a room, the sound system comprising:

a set of microphones for provision of one or more microphone input signals including a first microphone input signal;

a set of speakers; and a processing device connected to the set of microphones and to the set of speakers, the processing device comprising a signal processor;

wherein the signal processor is configured to determine one or more output signals for the set of speakers for matching of sound entering the room through an opening in a wall of the room, wherein the one or more output signals are based on at least the first microphone input signal, and wherein at least some of the speakers are arranged across the opening to form an uneven coverage of an area of the opening; and wherein the set of speakers is configured to output sound signals based on the one or more output signals.

16. The sound system according to claim 15, wherein the set of speakers comprises a sparse array of speakers, the sparse array of speakers comprising N rows and M columns, and wherein the number N of rows in the sparse array is at least three and the number M of columns in the sparse array is at least three.

17. The sound system according to claim 15, wherein the set of speakers comprises a sparse array of speakers, wherein the sparse array of speakers comprises at least a first center column of speakers to be arranged in the opening, and wherein the number of speakers in the first center column is at least five.

18. The sound system according to claim 15, wherein the set of speakers comprises a sparse array of speakers, wherein the sparse array of speakers comprises at least a first center row of speakers to be arranged in the opening, and wherein the number of speakers in the first center row is at least five.

19. The sound system according to claim 15, wherein the set of speakers comprises a sparse array of speakers, and wherein the sparse array of speakers forms at least 3 cells.

20. The sound system according to claim 15, wherein the at least some of the speakers are arranged across the opening to define at least two cells in the opening, each of the cells having an area that is larger than a cross-sectional area of each of the speakers.

21. The sound system according to claim 15, wherein the at least some of the speakers are arranged across the opening to at least partly define a cell in the opening, wherein the cell has a first dimension along a first direction, and a second dimension along a second direction perpendicular to the first direction, wherein the first dimension of the cell is larger than a first spacing between a first pair of adjacent speakers in the at least some of the speakers arranged along the first direction, and wherein the second dimension of the cell is larger than a second spacing between a second pair of adjacent speakers in the at least some of the speakers arranged along the second direction.

* * * * *